US012759402B1

(12) United States Patent
Slakans et al.

(10) Patent No.: US 12,759,402 B1
(45) Date of Patent: *Oct. 13, 2026

(54) INTEGRATED ELECTRIC POWER TAKE-OFF FOR USE WITH AN ELECTRIC VEHICLE

(71) Applicant: Parker-Hannifin Corporation, Cleveland, OH (US)

(72) Inventors: Bradley A. Slakans, Collierville, NC (US); Jonathan S. Hedge, Memphis, TN (US); Curtis R. Dalton, Olive Branch, MS (US); Brian L. Rang, Olive Branch, MS (US); Steven Wesley Bennett, Noblesville, IN (US); James H. Blalock, Olive Branch, MS (US)

(73) Assignee: Parker-Hannifin Corporation, Cleveland, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/213,126

(22) Filed: May 20, 2025

Related U.S. Application Data

(63) Continuation of application No. 18/522,979, filed on Nov. 29, 2023, now Pat. No. 12,319,138.

(Continued)

(51) Int. Cl.
*B60L 1/00* (2006.01)
*F16H 57/02* (2012.01)

(Continued)

(52) U.S. Cl.
CPC .............. *B60L 1/00* (2013.01); *F16H 57/025* (2013.01); *F16H 57/0436* (2013.01);

(Continued)

(58) Field of Classification Search
CPC ..... B60K 17/28; B60L 1/003; B60W 30/1888
See application file for complete search history.

(56) References Cited

U.S. PATENT DOCUMENTS 12,319,138 B2 * 6/2025 Slakans .................. B60K 17/28
2020/0149622 A1 5/2020 Kuhl et al.
2021/0291806 A1 9/2021 Forte et al.

FOREIGN PATENT DOCUMENTS

DE 10 2021 200317 A1 8/2021
EP 2 585 738 B1 3/2016

(Continued)

OTHER PUBLICATIONS

European Communication pursuant to Article 94(3), Application No. 23 213 379.3, dated May 13, 2025.

(Continued)

*Primary Examiner* — Faye M Fleming
(74) *Attorney, Agent, or Firm* — McDonnell Boehnen Hulbert & Berghoff LLP

(57) ABSTRACT

An integrated electric power take-off includes an electric motor that is driven by an electric motor of an electric vehicle, a hydraulic pump or a similar device that is adapted to operate a rotatably driven accessory provided on the electric vehicle, and a geartrain system connected between the electric motor and the hydraulic pump. The geartrain system is an integral portion of the integrated electric power take-off that permits an optimal selection of the electric motor and the hydraulic pump to be made for each specific application.

20 Claims, 8 Drawing Sheets

Related U.S. Application Data

(60) Provisional application No. 63/428,808, filed on Nov. 30, 2022.

(51) Int. Cl.
*F16H 57/025* (2012.01)
*F16H 57/04* (2010.01)

(52) U.S. Cl.
CPC .................... *F16H 57/0476* (2013.01); *F16H 2057/02034* (2013.01); *F16H 2057/02082* (2013.01)

(56) References Cited

FOREIGN PATENT DOCUMENTS

| | | | |
|---|---|---|---|
| EP | 4 029 710 | A1 | 7/2022 |
| WO | 2020/169539 | A1 | 8/2020 |

OTHER PUBLICATIONS

Communication pursuant to Article 94(3) EPC issued by the European Patent Office in application No. EP 23 213 379.3 dated Apr. 1, 2026.

Communication pursuant to Article 94(3) EPC issued by the European Patent Office in application No. EP 23 213 379.3 dated Jul. 23, 2026.

* cited by examiner

INTEGRATED ELECTRIC POWER TAKE-OFF FOR USE WITH AN ELECTRIC VEHICLE

CROSS-REFERENCE TO RELATED APPLICATIONS

This application is a continuation of U.S. application Ser. No. 18/522,979 filed Nov. 29, 2023, which claims the benefit of U.S. Provisional Application No. 63/428,808, filed Nov. 30, 2022, the disclosures of which are incorporated herein by reference.

BACKGROUND OF THE INVENTION

This invention relates in general to power take-offs for transmitting rotational energy from a source of rotational energy to a rotatably driven accessory. In particular, this invention relates to an integrated electric power take-off that can be driven by a vehicle engine having an electric motor to operate the rotatably driven accessory.

A power take-off is a well known mechanical device that is often used in conjunction with a source of rotational energy, such as a vehicle engine or transmission, to transfer rotational energy to a rotatably driven accessory, such as a hydraulic pump that is supported on the vehicle. For example, power take-offs are commonly used on commercial, industrial, and agricultural vehicles to transfer rotational energy from the vehicle engine or transmission to one or more hydraulic pumps or other devices that, in turn, are used to operate hydraulically driven accessories provided on the vehicle, such as plows, trash compactors, lifting mechanisms, winches, and the like. The power take-off provides a simple, inexpensive, and convenient means for transferring energy from the source of rotational energy to the hydraulic pump that, in turn, can be operated to transfer relatively high pressure fluid to operate the driven accessory.

A typical power take-off includes a housing, an input mechanism, and an output mechanism. The power take-off housing is frequently supported on a housing of the source of rotational energy. The power take-off housing includes an opening that is aligned with a corresponding opening provided in the housing of the source of rotational energy. The input mechanism of the power take-off includes a portion (typically a spur gear) that extends outwardly from the power take-off housing through the aligned openings and into the housing of the source of rotational energy. In this manner, the input mechanism of the power take-off is connected to the source of rotational energy so as to be rotatably driven whenever the source of rotational energy is operated. The output mechanism of the power take-off is rotatably driven by the input mechanism and is adapted to be connected to the rotatably driven accessory. In some instances, the input mechanism of the power take-off is directly connected to the output mechanism such that the rotatably driven accessory is operated whenever the source of rotational energy is operated. In other instances, a clutch assembly is provided between the input mechanism and the output mechanism such that the rotatably driven accessory is operated only when the clutch assembly is engaged while the source of rotational energy is operated.

Thus, traditionally, a power take-off allows a vocational truck or other vehicle that is adapted to perform vocational work by driving pumps, compressors, generators, or other implements directly from the transmission of the vehicle, which is coupled to the internal combustion or diesel engine of the vehicle. The engine and transmission are primarily provided for use as the prime mover of the vehicle, whereas the work performed by the power take-off is considered to be an auxiliary purpose. In those instances where an internal combustion or diesel engine is not available for supplying energy to perform the auxiliary work, either due to regulations regarding engine use or in the case of an electric vehicle, another source of energy is required to extract stored energy from the vehicle and convert it into usable work by operating the rotatably driven accessory.

Conventional electric power take-offs are also known in the art. However, conventional electric power take-offs generally include a standalone electric motor portion that is coupled directly to a standalone hydraulic pump portion. Consequently, it has been found to be difficult to provide a combined assembly of the electric motor portion and hydraulic pump portion that is optimized for use for any given work application. Consequently, conventional electric power take-offs often use oversized motors to achieve a required torque for a given application, which undesirably increases the physical size and cost thereof. Also, such oversized motors are frequently operated outside of their optimal speeds and torques, which undesirably results in even lower efficiency, shorter run times, and/or larger battery sizes. Furthermore, wasted energy is realized in the form of heat, which requires the implementation of additional cooling measures to prevent overheating. All of these undesirable outcomes result from either the electric motor or the hydraulic pump (or both) being mis-matched with and/or over-designed for use in a specific application.

Thus, it would be desirable to provide an integrated electric power take-off assembly that includes not only includes an electric motor portion (which is driven by the electric motor of the vehicle) and a hydraulic pump portion (or similar device that is adapted to operate a rotatably driven accessory), but additionally includes a geartrain portion having a predetermined gear ratio that allows an optimal selection of both the electric motor portion and the hydraulic pump portion for use in each specific application.

SUMMARY OF THE INVENTION

This invention relates to an integrated electric power take-off that can be driven by a vehicle engine having an electric motor so as to operate a rotatably driven accessory. Such an integrated electric power take-off can be used in lieu of a conventional power take-off that is commonly provided on a vehicle that is operated by an internal combustion or diesel engine. The integrated electric power take-off of this invention is connected to a battery of the electric vehicle and converts electrical energy from the battery into mechanical or hydraulic energy that can be used to operate the rotatably driven accessory or other work truck equipment provided on the vehicle. To accomplish this, the integrated electric power take-off assembly of this invention includes an electric motor portion (which is driven by the electric motor of the vehicle), a hydraulic pump portion (or similar device that is adapted to operate a rotatably driven accessory provided on the vehicle), and a geartrain portion that is connected between the electric motor and the hydraulic pump. The inclusion of the geartrain portion permits an optimally efficient selection of the electric motor portion and the hydraulic pump portion to be made for each specific application for the integrated electric power take-off.

Various aspects of this invention will become apparent to those skilled in the art from the following detailed description of the preferred embodiments, when read in light of the accompanying drawings.

DETAILED DESCRIPTION OF THE PREFERRED EMBODIMENTS

Figure 1:
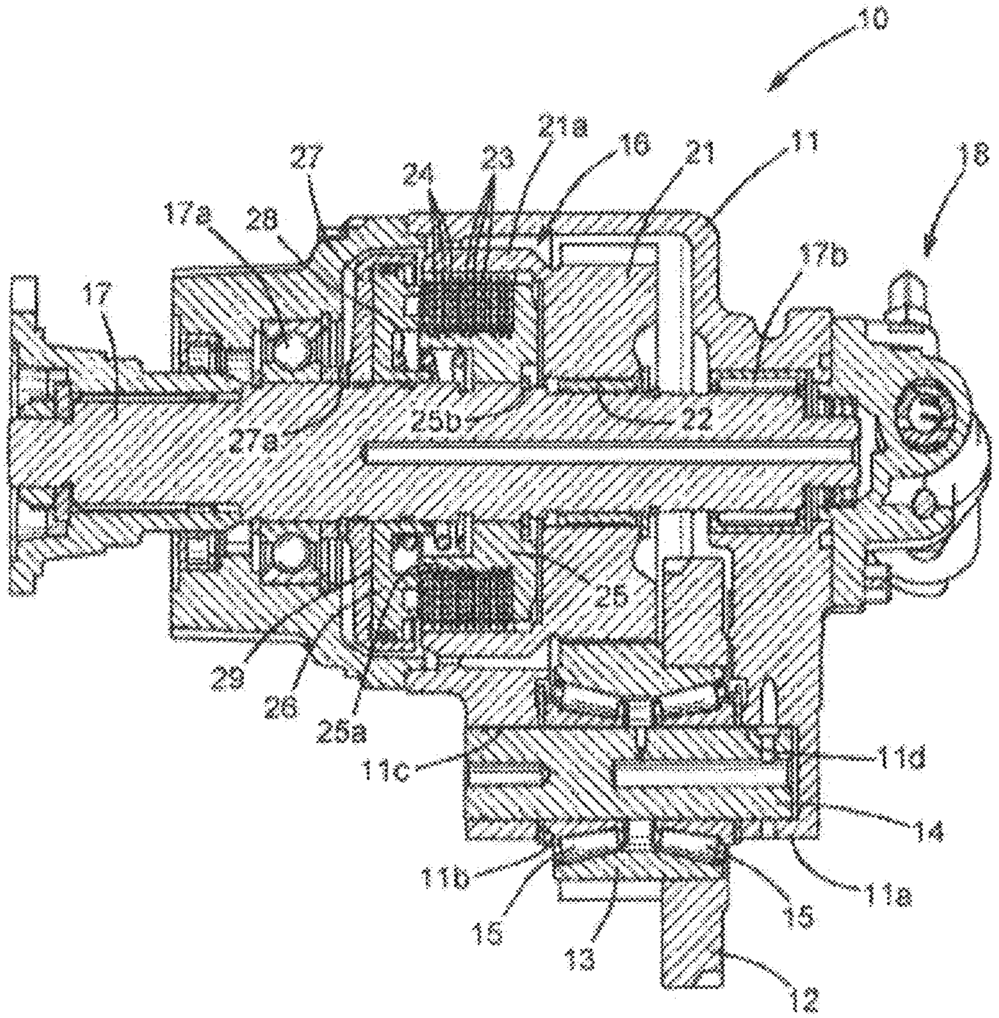
FIG. 1 (Prior Art)
FIG. 1 is a sectional elevational view of a prior art structure for a power take-off that is adapted to be rotatably driven by a transmission of the vehicle that, in turn, is coupled to an internal combustion or diesel engine.

Referring now to the drawings, there is illustrated in FIG. 1 a sectional elevational view of a prior art power take-off, indicated generally at 10, that is conventional in the art. The basic structure and mode of operation of the prior art power take-off 10 are well known in the art, and only those portions of the prior art power take-off 10 that are necessary for a complete understanding of the invention will be described.

The prior art power take-off 10 includes a hollow housing 11 having a mounting surface 11*a* provided thereon. An opening 11*b* is provided through the mounting surface 11*a* of the power take-off housing 11. An input gear 12 is rotatably supported within the power take-off housing 11 and includes a portion that extends outwardly through the opening 11*b* provided through the mounting surface 11*a*.

The mounting surface 11*a* of the power take-off housing 11 is adapted to be secured (typically by a plurality of bolts) to a corresponding mounting surface (not shown) provided on a source of rotational energy (not shown), such as an engine or a transmission of a vehicle. As is well known in the art, the portion of the input gear 12 that extends through the opening 11*b* of the power take-off housing 11 is adapted to extend within a portion of the source of rotational energy and engage a corresponding gear (not shown) or other mechanism provided therein. Thus, the input gear 12 of the power take-off 10 is rotatably driven whenever the corresponding gear contained within the source of rotational energy is rotatably driven.

The illustrated input gear 12 is splined onto or otherwise supported on an input gear hub 13 for concurrent rotation to form an input cluster gear. However, it is known to form the input gear 12 and the input gear hub 13 integrally from a single piece of material. In either event, the input gear hub 13 is, in turn, rotatably supported on an input shaft 14 by a pair of roller bearings 15. First and second ends of the illustrated input shaft 14 are respectively (and non-rotatably) supported in first and second bores 11*c* and 11*d* provided in the power take-off housing 11.

The prior art power take-off 10 also includes a clutch assembly, indicated generally at 16, for selectively the connecting the input gear hub 13 to an output shaft 17. The output shaft 17 is, in turn, adapted to be connected to the rotatably driven accessory (not shown). The illustrated output shaft 17 is rotatably supported on the power take-off housing 11 by a pair of bearings 17*a* and 17*b* or other similar means. When the clutch assembly 16 is engaged, the input gear hub 13 is connected to the output shaft 17 for concurrent rotation. Thus, the rotatably driven accessory is rotatably driven by the source of rotational power when the clutch assembly 16 is engaged. Conversely, when the clutch assembly 16 is disengaged, the input gear hub 13 is disconnected from the output shaft 17. Thus, the rotatably driven accessory is not rotatably driven by the source of rotational power when the clutch assembly 16 is disengaged. A conventional shifter assembly, indicated generally at 18, may be provided to selectively engage and disengage the clutch assembly 16 in a known manner.

The clutch assembly 16 of the prior art power take-off 10 includes a drive gear 21 that is rotatably driven by the input gear hub 13. The illustrated drive gear 21 includes an axially-extending hollow cylindrical bell portion 21*a* having a splined inner surface. The illustrated drive gear 21 is rotatably supported on the output shaft 17 by a bearing 22 and is formed integrally from a single piece of material with the hollow cylindrical bell portion 21*a*. However, it is known to form the drive gear 21 and the hollow cylindrical bell portion 21*a* from separate components that are splined or otherwise connected together for concurrent rotation. In either event, a plurality of flat annular clutch plates 23 is splined to the inner splined surface of the hollow cylindrical bell portion 21*a* of the drive gear 21 for rotation therewith. Thus, the drive gear 21 and the clutch plates 23 are constantly rotatably driven by the input gear 12.

A plurality of annular friction plates 24 is disposed in alternating fashion between the clutch plates 23. The friction plates 24 are splined to an outer splined surface provided on an axially extending cylindrical portion 25*a* of a clutch gear 25 for rotation therewith. The clutch gear 25 is splined or otherwise secured to the output shaft 17 for rotation therewith. Thus, the friction plates 24, the clutch gear 25, and the output shaft 17 are connected for rotation together as a unit. The clutch gear 25 is restrained from axial movement in one direction (toward the right when viewing FIG. 1) by one or more retaining rings 25*b* that are mounted on the output shaft 17, for a purpose that will be explained below.

An annular clutch piston 26 is provided for selectively causing the clutch plates 23 and the friction plates 24 to frictionally engage one another so as to engage the clutch assembly 16. To accomplish this, the clutch piston 26 is disposed within a hollow cylindrical clutch cylinder 27. The clutch cylinder 27 has a closed end and an opened end. One end of the clutch piston 26 (the left end when viewing FIG. 1) is disposed within the clutch cylinder 27, while the opposite end of the clutch piston 26 (the right end when viewing FIG. 1) extends from the opened end of the clutch cylinder 27 adjacent to the clutch plates 23 and friction plates 24. Both the clutch piston 26 and the clutch cylinder 27 are supported on the output shaft 17 The clutch piston 26 is axially movable along the output shaft 17 but the clutch cylinder 27 is restrained from axial movement in one direction (toward the left when viewing FIG. 1) by one or more retaining rings 27*a* that are mounted on the output shaft 17 for a purpose that will be explained below.

A coiled clutch spring 28 reacts between the clutch piston 26 and the clutch gear 25. As discussed above, the clutch gear 25 is restrained from axial movement in one direction (toward the right when viewing FIG. 1) by the retaining ring 25*b*. Thus, the clutch spring 28 urges the clutch piston 26 axially in the opposite direction (toward the left when viewing FIG. 1) toward a disengaged position adjacent to the closed end of the clutch cylinder 27. In the disengaged position, the clutch piston 26 does not engage the clutch plates 23 and the friction plates 24. Thus, the clutch plates 23 and the friction plates 24 do not frictionally engage one another. As a result, the clutch gear 25 is disconnected from the drive gear 21 so as to provide no rotatable driving connection therebetween.

To engage the clutch assembly 16, the shifter assembly 18 is actuated to supply pressurized fluid to an annular clutch chamber 29 defined between the clutch piston 26 and the closed end of the clutch cylinder 27. As a result, the clutch piston 26 is moved axially in the one direction (toward the right when viewing FIG. 1) toward an engaged position. In the engaged position, the clutch piston 26 causes the clutch plates 23 and the friction plates 24 to frictionally engage one another. As a result, the clutch gear 25 is connected to the drive gear 21 so as to provide a rotatable driving connection therebetween.

FIGS. 2 through 8 illustrate a variety of embodiments of an integrated electric power take-off in accordance with this invention that are each particularly well-suited for use in electric vehicle applications, as opposed to the prior art power take-off described above in connection with FIG. 1. In general, the integrated electric power take-off of this invention is adapted to be connected to a battery of the electric vehicle and to convert electrical energy from that battery into mechanical or hydraulic energy that will be used to operate a rotatably driven accessory provided on the electric vehicle, as described above. Thus, the integrated electric power take-off of this invention uses the electric energy provided from the electric vehicle to perform vocational tasks that are similar to those that would be performed by a conventional power take-off driven by a conventional internal combustion or diesel engine.

Figure 9:
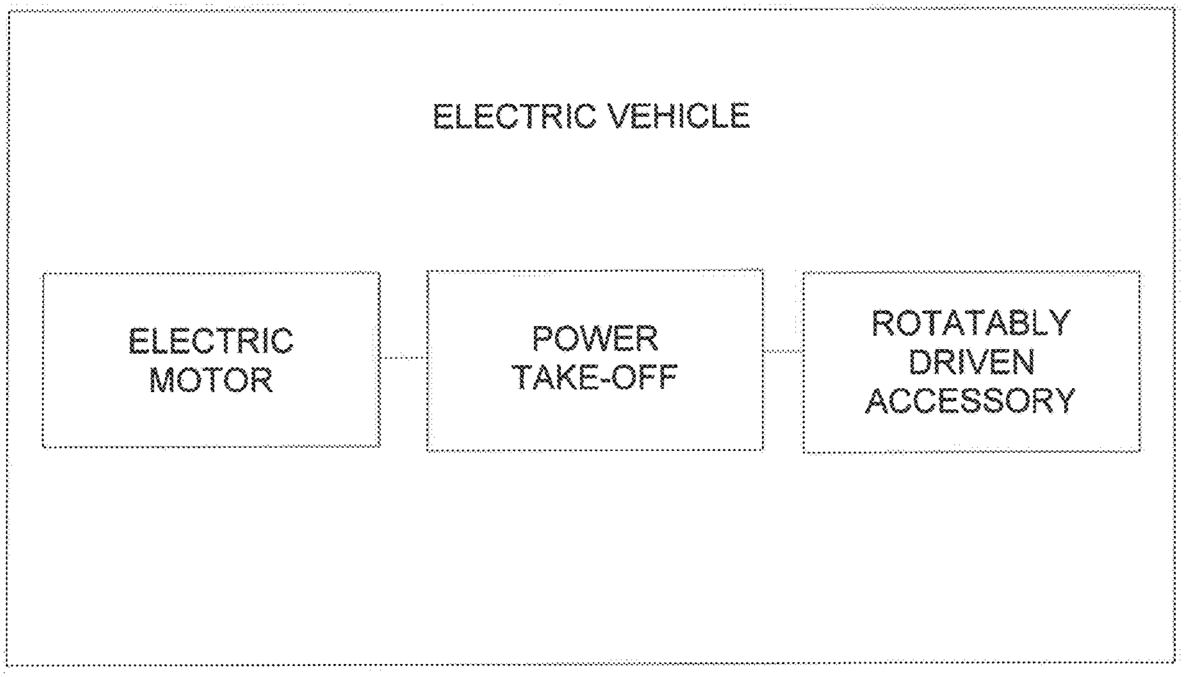
FIG. 9 is a schematic illustration of an electric vehicle including an electric motor, an integrated electric power take-off assembly, and a rotatably driven accessory in accordance with this invention.

More specifically, as shown in FIG. 9, the integrated electric power take-off assembly of this invention includes an electric motor portion (which is adapted to be driven by the electric motor of the vehicle), a hydraulic pump portion (or a similar device that is adapted to operate a rotatably driven accessory provided on the vehicle), and a geartrain portion that is connected between the electric motor portion and the portion hydraulic pump. The geartrain portion is an integral portion of the integrated electric power take-off and includes two or more meshing gears that provide a desirable gear reduction ratio and thus permits optimal selections of the electric motor portion and the hydraulic pump portion to be made for each specific work application quickly, easily, and inexpensively. Such optimal selection of the electric motor portion and the hydraulic pump portion provides a number of significant advantages over conventional electric power take-offs, including (but not limited to) a reduction in the overall weight, physical size, and cost of the integrated electric power take-off, an enhanced ability to monitor and control the operation of the integrated electric power take-off, and an efficient optimization of the cooling and lubrication of the integrated electric power take-off during operation.

Thus, the integrated electric power take-off of this invention provides solutions to two main issues that are commonly encountered with conventional (i.e., non-integrated) electric power take-offs. First, the integrated electric power take-off of this invention provides mechanical power output to operate one or more rotatably driven accessories on fully electric vehicles, which has not previously been feasible with conventional electric power take-offs because a significant change in the drive-train architecture was necessitated. Second, the "integrated" nature of the electric power take-off of this invention integrates the sub-systems (i.e., the electric motor portion, the geartrain portion, and the hydraulic pump portion) in such a way as to provide the most efficient and cost effective product currently available for the electric work truck (or other type of electric vehicle) market. The sub-systems in the electric power take-off of this invention are carefully selected for optimal operating points, and the differences therebetween are accommodated by the use of gear ratios that are selected to provide the most efficient, right-sized system for the application. This "right-sizing" allows for the frame size of the motor portion to be typically one to two sizes smaller, which reduces cost significantly. Because the overall system is much smaller and operates at or near its most optimal speeds and torques, undesirable energy losses (resulting from unnecessary heat generation) are much lower. This enables the cooling to be contained within the integrated electric power take-off without requiring the use of an external cooling system, such as might be provided on the vehicle. It also increases the run time and/or reduces the battery size.

The integrated electric power take-off of this invention includes a geartrain portion to facilitate the operation of the electric motor portion and driven equipment at different speeds, which allows both of these components to be operated at their respective peak efficiency speed ranges. Improving efficiency in this way reduces battery drain and, as a result, improves the range of the electric vehicle.

The electric power take-off of this invention is a fully integrated unit and is not merely a collection of existing parts. All of the electric motor portion (including its associated electronic control components, such as an inverter and the like), the geartrain portion (including, if desired, a clutch), and the output portion (including the hydraulic pump or output components) can be carried within or supported on a single housing. Dedicated liquid cooling and lubrication systems may be built into the integrated electric power take-off of this invention. These systems are used to cool the motor, inverter, gears, and bearings, and may also be used to lubricate moving parts in the electric motor, along with the gears, and bearings.

Figure 2:
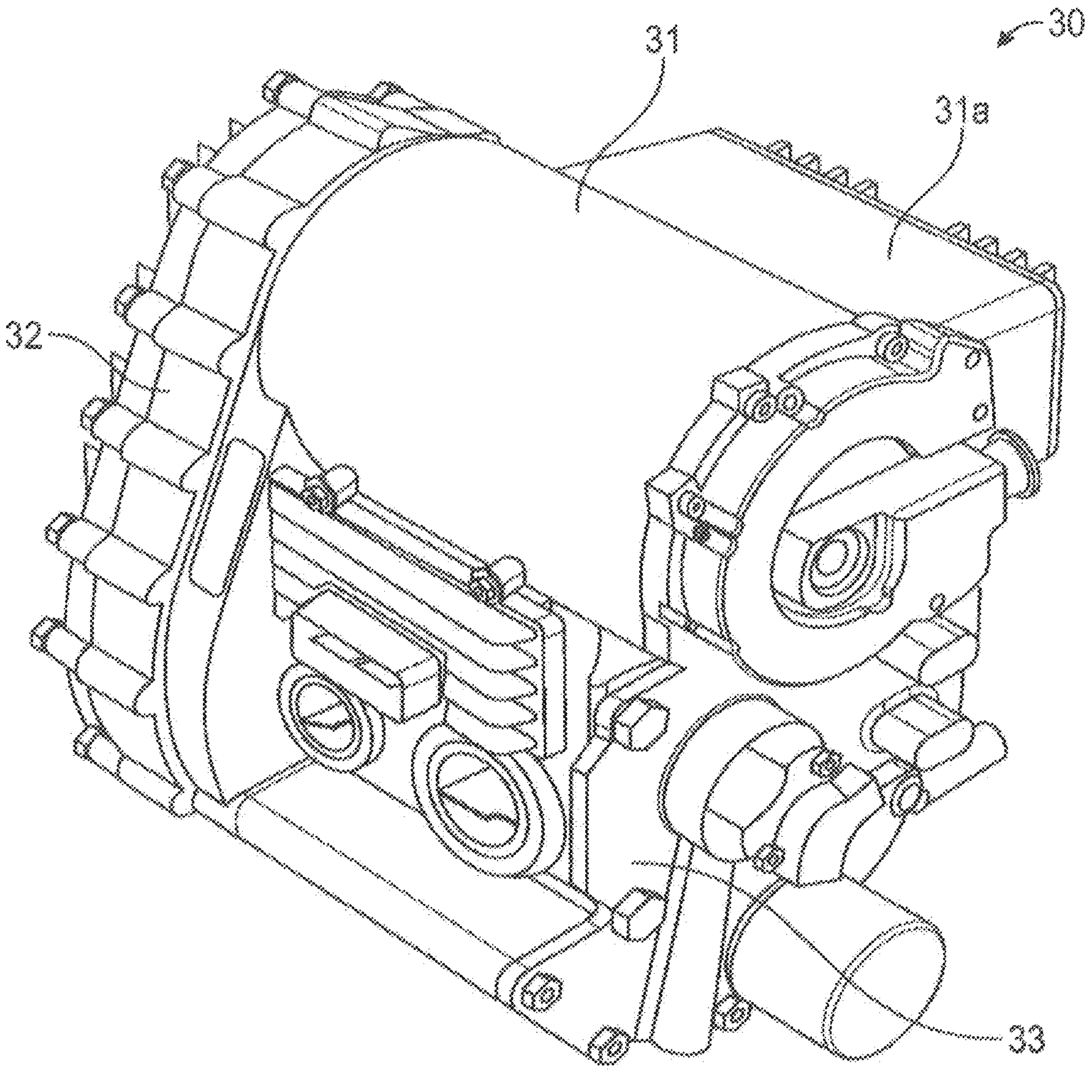
FIG. 2 is a perspective view of a first embodiment of an integrated electric power take-off in accordance with this invention.

FIG. 2 is a perspective view of a first embodiment, indicated generally at 30, of an integrated electric power take-off in accordance with this invention. The first embodiment of the integrated electric power take-off 30 includes an electric motor portion 31 that is adapted to be operated by an electric motor (not shown) provided on an electric vehicle, an output portion 33 that is adapted to operate a rotatably driven accessory (not shown) provided on the electric vehicle, and a geartrain portion 32 that is connected between the electric motor portion 31 and the output portion 33. When the electric motor portion 31 is operated by the electric motor of the electric vehicle, the geartrain portion 32 operates the output portion 33 to operate the rotatably driven accessory provided on the electric vehicle. The illustrated electric motor portion 31 includes associated control components 31*a* (such as an inverter and the like), although such is not required.

Figure 3:
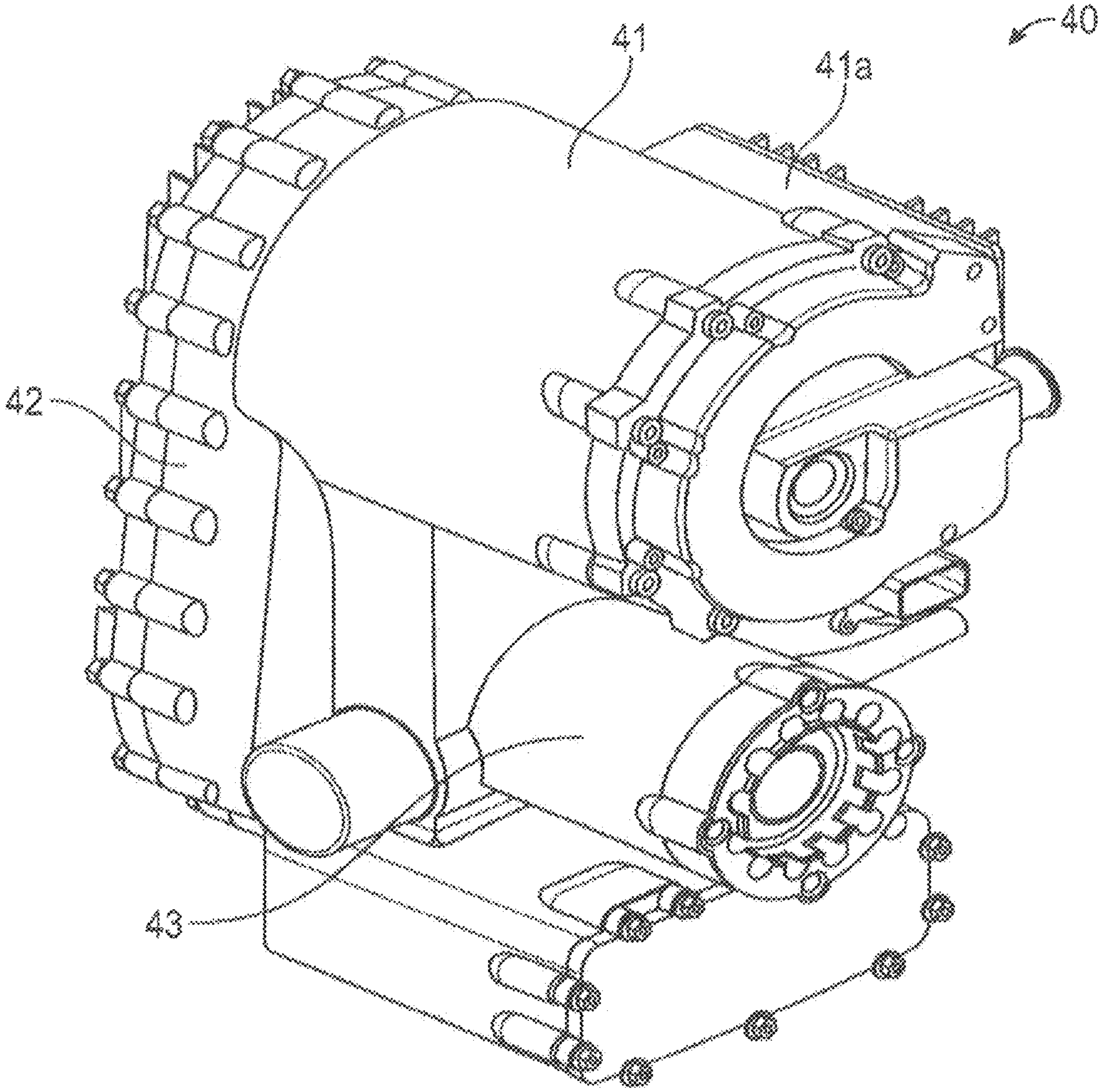
FIG. 3 is a perspective view of a second embodiment of an integrated electric power take-off in accordance with this invention.

FIG. 3 is a perspective view of a second embodiment, indicated generally at 40, of an integrated electric power take-off in accordance with this invention. The second embodiment of the integrated electric power take-off 40 includes an electric motor portion 41 that is adapted to be operated by an electric motor (not shown) of an electric vehicle, an output portion 43 that is adapted to operate a rotatably driven accessory (not shown) provided on the electric vehicle, and a geartrain portion 42 that is connected between the electric motor portion 41 and the output portion 43. When the electric motor portion 41 is operated by the electric motor of the electric vehicle, the geartrain portion 42 operates the output portion 43 to operate the rotatably driven accessory provided on the electric vehicle. The illustrated electric motor portion 41 includes associated control components 41*a* (such as an inverter and the like), although such is not required.

Figure 4:
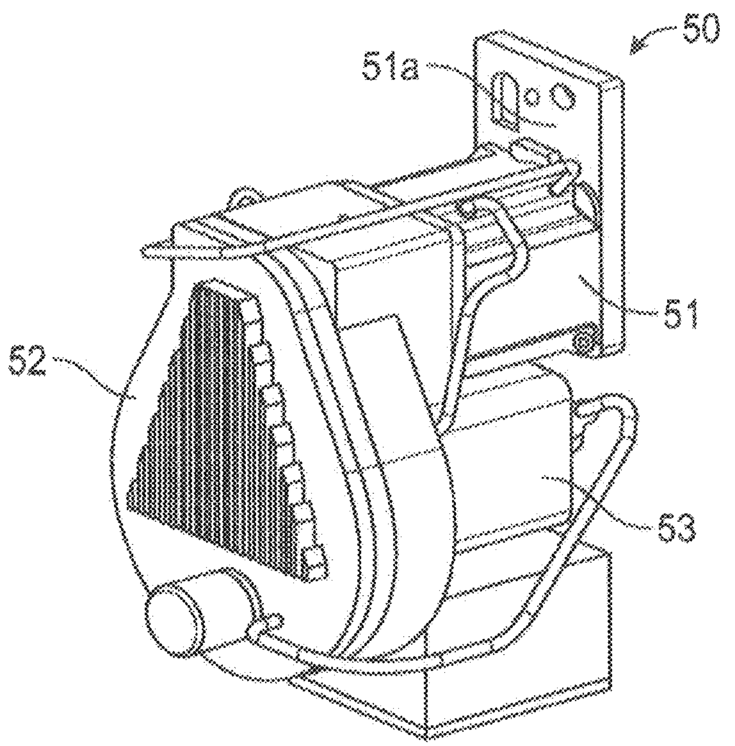
FIG. 4 is a perspective view of a third embodiment of an integrated electric power take-off in accordance with this invention.

FIG. 4 is a perspective view of a third embodiment, indicated generally at 50, of an integrated electric power take-off in accordance with this invention. The third embodiment of the integrated electric power take-off 50 includes an electric motor portion 51 that is adapted to be operated by an electric motor (not shown) of an electric vehicle, an output portion 53 that is adapted to operate a rotatably driven accessory (not shown) provided on the electric vehicle, and a geartrain portion 52 that is connected between the electric motor portion 51 and the output portion 53. When the electric motor portion 51 is operated by the electric motor of the electric vehicle, the geartrain portion 52 operates the output portion 53 to operate the rotatably driven accessory provided on the electric vehicle. The illustrated electric motor portion 51 includes associated control components 51*a* (such as an inverter and the like), although such is not required.

Figure 5:
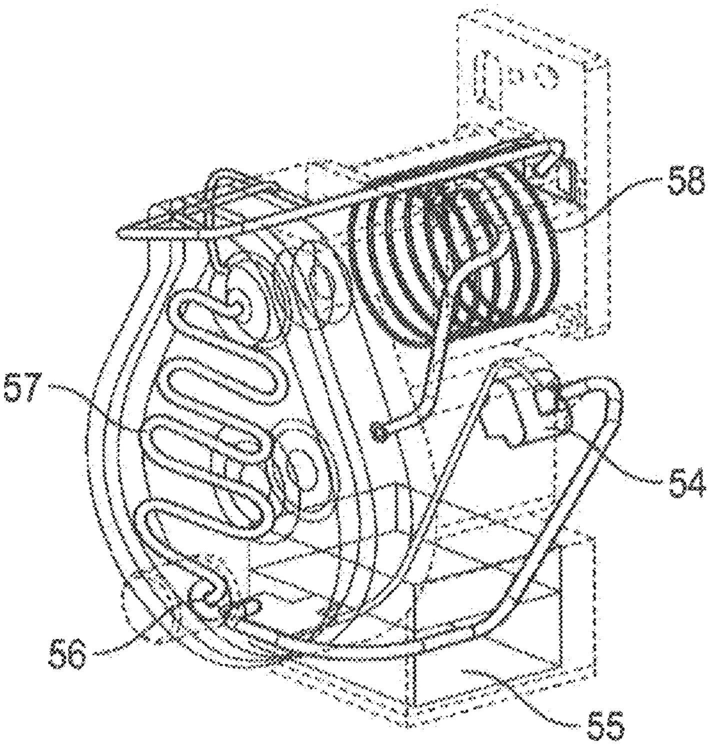
FIG. 5 is a schematic perspective view of an internal lubricant and coolant flow system of the third embodiment of the integrated electric power take-off illustrated in FIG. 4.
Figure 6:
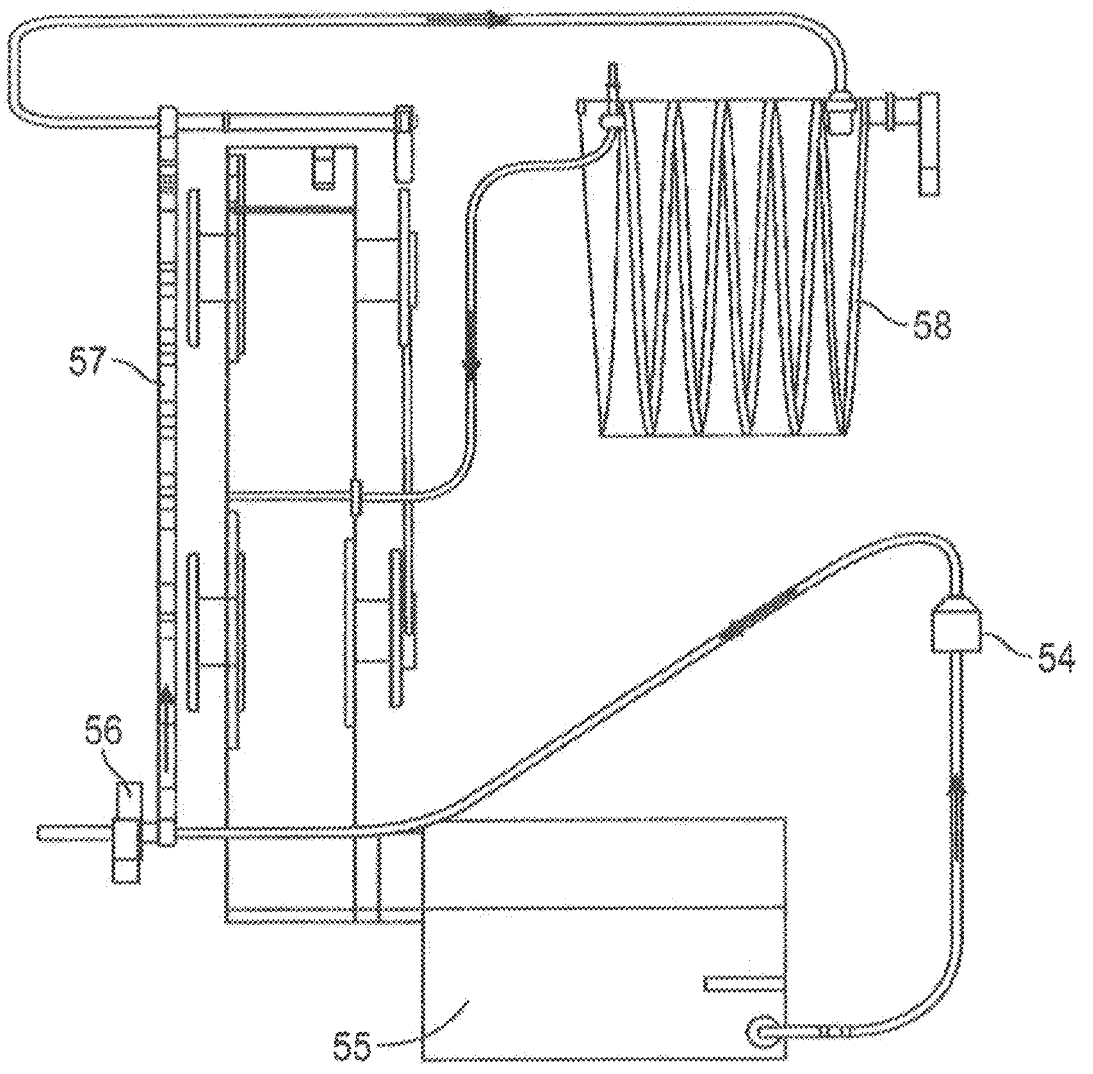
FIG. 6 is a schematic elevational view of the internal lubricant and coolant flow system of the third embodiment of the integrated electric power take-off illustrated in FIG. 5.

FIGS. 5 and 6 respectively illustrate schematic perspective and elevational views of a lubricant and coolant flow system for the third embodiment 50 of the integrated electric power take-off illustrated in FIG. 4. The illustrated lubricant and coolant flow system includes a fluid pump 54 that is adapted to circulate oil or other lubricant and/or coolant from a sump 55 through a filter 56, a first cooling structure 57 that is supported adjacent to the exterior of the geartrain portion 52, a second cooling structure 58 that is supported adjacent to the exterior of the electric motor portion 51, through the interior of the geartrain portion 52, and back to the sump 55. Thus, the oil or other lubricant and/or coolant from the sump 55 not only cools the components of both the geartrain portion 52 and the electric motor portion 51 during operation, but further lubricates the bearings and other internal components of the geartrain portion 52 during operation.

Figure 7:
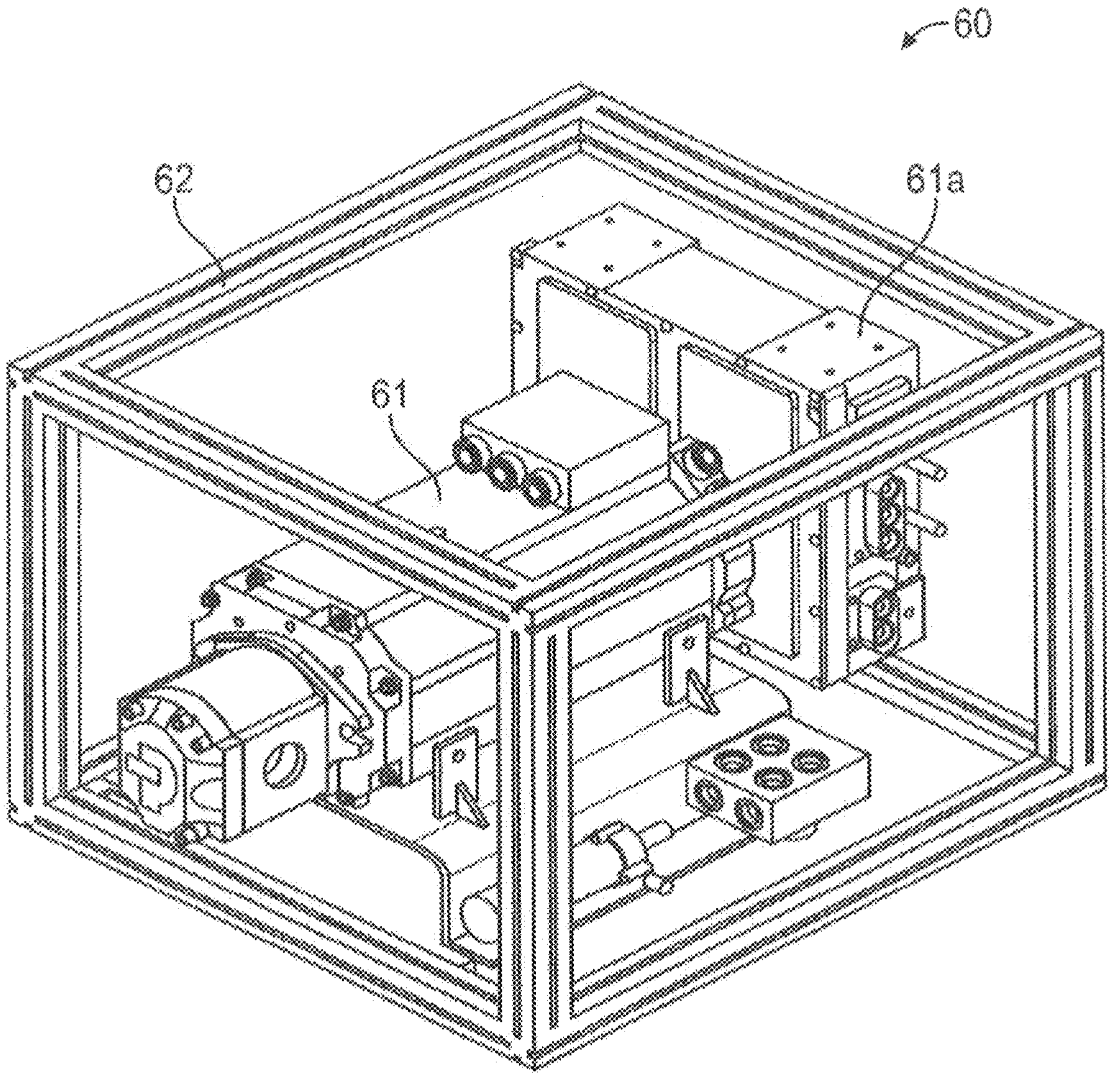
FIG. 7 is a perspective view of a fourth embodiment of an integrated electric power take-off in accordance with this invention.

FIG. 7 is a perspective view of a fourth embodiment, indicated generally at 60, of an integrated electric power take-off in accordance with this invention. The fourth embodiment of the integrated electric power take-off 60 includes an electric motor portion 61 that is adapted to be operated by an electric motor (not shown) of an electric vehicle, an output portion (not shown) that is adapted to operate a rotatably driven accessory (not shown) provided on the electric vehicle, and a geartrain portion (not shown) that is connected between the electric motor portion 61 and the output portion. When the electric motor portion 61 is operated by the electric motor of the electric vehicle, the geartrain portion operates the output portion to operate the rotatably driven accessory provided on the electric vehicle. The electric motor portion may include associated control components (not shown) such as an inverter and the like, although such is not required. Some or all of the components of the fourth embodiment of the integrated electric power take-off 60 are supported on a frame 62.

Figure 8:
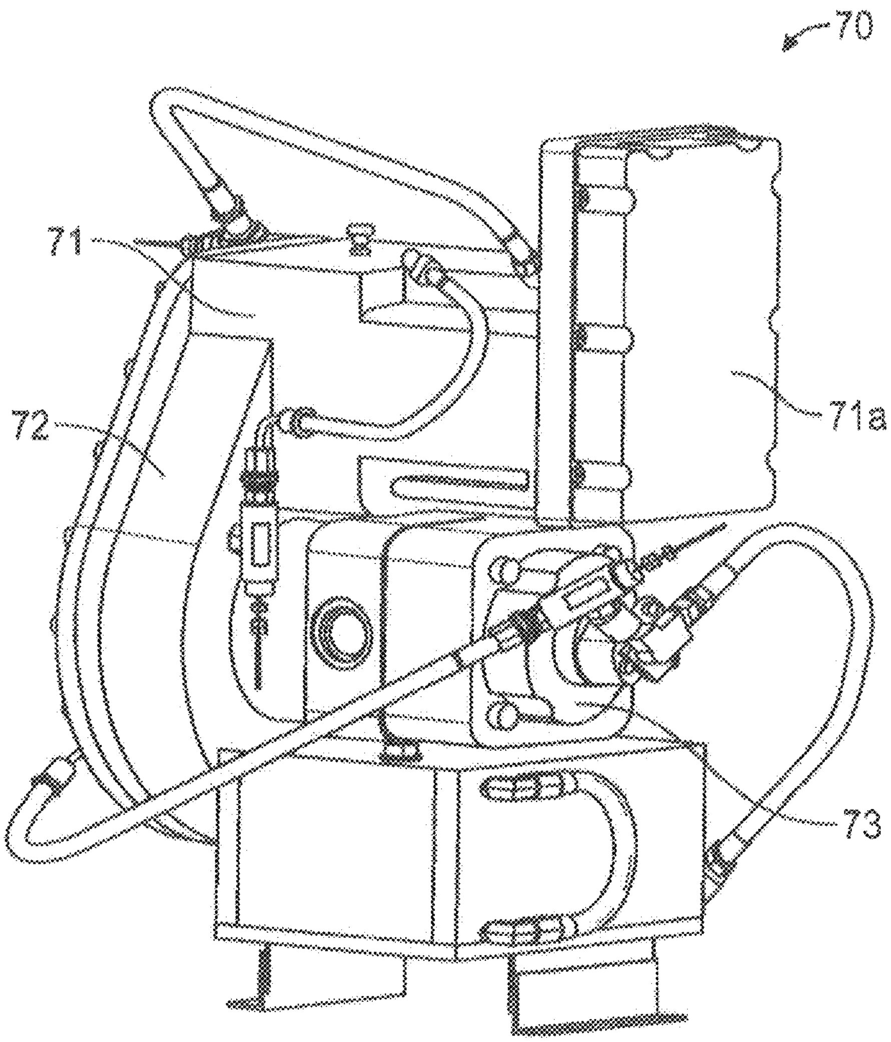
FIG. 8 is a perspective view of a fifth embodiment of an integrated electric power take-off in accordance with this invention.

FIG. 8 is a perspective view of a fifth embodiment, indicated generally at 70, of an integrated electric power take-off in accordance with this invention. The fifth embodiment of the integrated electric power take-off 70 includes an electric motor portion 71 that is adapted to be operated by an electric motor (not shown) of an electric vehicle, an output portion 73 that is adapted to operate a rotatably driven accessory (not shown) provided on the electric vehicle, and a geartrain portion 72 that is connected between the electric motor portion 71 and the output portion 73. When the electric motor portion 71 is operated by the electric motor of the electric vehicle, the geartrain portion 72 operates the output portion 73 to operate the rotatably driven accessory provided on the electric vehicle. The illustrated electric motor portion 71 includes associated control components 71*a* (such as an inverter and the like), although such is not required.

The principle and mode of operation of this invention have been explained and illustrated in its preferred embodiments. However, it must be understood that this invention may be practiced otherwise than as specifically explained and illustrated without departing from its spirit or scope.

What is claimed is:

1. An integrated electric power take-off comprising:

an electric motor portion that is adapted to be operated by an electric motor of an electric vehicle;

an output portion that is adapted to operate a rotatably driven accessory provided on the electric vehicle;

a geartrain portion connected between the electric motor portion and the output portion, wherein when the electric motor portion is operated by the electric motor of the electric vehicle, the geartrain portion operates the output portion to operate the rotatably driven accessory provided on the electric vehicle; and a lubricant and coolant flow system including a fluid pump adapted to circulate fluid from a sump through a first cooling structure supported adjacent to the electric motor portion and through a second cooling structure supported adjacent to the geartrain portion, and back to the sump.

2. The integrated electric power take-off defined in claim 1 wherein the geartrain portion includes two or more meshing gears that provide a gear reduction ratio between the electric motor portion and the output portion.

3. The integrated electric power take-off defined in claim 1 wherein the fluid pump is adapted to circulate the fluid through the first cooling structure and the second cooling structure in series before returning to the sump.

4. The integrated electric power take-off defined in claim 1 wherein the fluid pump is adapted to circulate the fluid through the first cooling structure and the second cooling structure in parallel before returning to the sump.

5. The integrated electric power take-off defined in claim 1 wherein the lubricant and coolant flow system further circulates the fluid through an interior of the geartrain portion before returning to the sump.

6. The integrated electric power take-off defined in claim 1 wherein the fluid comprises oil.

7. The integrated electric power take-off defined in claim 1 further including a filter through which the fluid is circulated.

8. The integrated electric power take-off defined in claim 1 further including a frame supporting the electric motor portion, the geartrain portion, and the output portion.

9. A method of manufacturing an integrated electric power take-off comprising the steps of:

(a) providing an electric motor portion that is adapted to be operated by an electric motor of an electric vehicle;

(b) providing an output portion that is adapted to operate a rotatably driven accessory provided on the electric vehicle;

(c) providing a geartrain portion having a gear ratio that is optimized for use in a given application for the integrated electric power take-off;

(d) connecting the geartrain portion between the electric motor portion and the output portion, wherein when the electric motor portion is operated by the electric motor of the electric vehicle, the geartrain portion operates the output portion to operate the rotatably driven accessory provided on the electric vehicle; and (e) providing a lubricant and coolant flow system including a fluid pump adapted to circulate fluid from a sump through a first cooling structure supported adjacent to the electric motor portion and through a second cooling structure supported adjacent to the geartrain portion, and back to the sump.

10. The method defined in claim 9 wherein the geartrain portion includes two or more meshing gears that provide a gear reduction ratio between the electric motor portion and the output portion.

11. The method defined in claim 9 wherein the fluid pump is adapted to circulate the fluid through the first cooling structure and the second cooling structure in series before returning to the sump.

12. The method defined in claim 9 wherein the fluid pump is adapted to circulate the fluid through the first cooling structure and the second cooling structure in parallel before returning to the sump.

13. The method defined in claim 9 wherein the lubricant and coolant flow system further circulates the fluid through an interior of the geartrain portion before returning to the sump.

14. An integrated electric power take-off comprising:

a housing;

an electric motor portion disposed within the housing and adapted to be operated by an electric motor of an electric vehicle;

an output portion adapted to operate a rotatably driven accessory provided on the electric vehicle;

a geartrain portion disposed within the housing and connected between the electric motor portion and the output portion, wherein when the electric motor portion is operated by the electric motor of the electric vehicle, the geartrain portion operates the output portion to operate the rotatably driven accessory provided on the electric vehicle; and an inverter disposed within the housing, wherein locating the inverter within the housing with the electric motor portion and the geartrain portion reduces electromagnetic interference.

15. The integrated electric power take-off defined in claim 14 wherein the geartrain portion includes two or more meshing gears that provide a gear reduction ratio between the electric motor portion and the output portion.

16. The integrated electric power take-off defined in claim 14 further including a lubricant and coolant flow system adapted to cool the electric motor portion, the geartrain portion, and the inverter.

17. The integrated electric power take-off defined in claim 16 wherein the lubricant and coolant flow system provides thermal management by cooling the electric motor portion, the geartrain portion, and the inverter using a common cooling fluid.

18. The integrated electric power take-off defined in claim 14 wherein the housing provides electromagnetic shielding for the inverter.

19. The integrated electric power take-off defined in claim 14 further including a frame supporting the housing.

20. The integrated electric power take-off defined in claim 14 wherein the inverter is electrically connected to the electric motor portion within the housing.

* * * * *